United States Patent
Cassell et al.

(10) Patent No.: US 7,587,630 B1
(45) Date of Patent: Sep. 8, 2009

(54) METHOD AND SYSTEM FOR RAPIDLY RECOVERING DATA FROM A "DEAD" DISK IN A RAID DISK GROUP

(75) Inventors: Loellyn Cassell, Pleasanton, CA (US); Atul Goel, Santa Clara, CA (US); James Leong, Hillsborough, CA (US); Rajesh Sundaram, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 742 days.

(21) Appl. No.: 11/118,674

(22) Filed: Apr. 29, 2005

(51) Int. Cl.
*G06F 11/00* (2006.01)

(52) U.S. Cl. ............................. 714/7; 714/47
(58) Field of Classification Search ........................ None
See application file for complete search history.

(56) References Cited

U.S. PATENT DOCUMENTS

| | | | | |
|---|---|---|---|---|
| 5,611,069 A | * | 3/1997 | Matoba ........................ 711/114 |
| 5,727,144 A | * | 3/1998 | Brady et al. .................... 714/6 |
| 5,737,510 A | * | 4/1998 | Kakuta et al. .................. 714/6 |
| RE36,846 E | | 8/2000 | Ng et al. |
| 6,154,853 A | * | 11/2000 | Kedem .......................... 714/6 |
| 6,401,214 B1 | | 6/2002 | Li |
| 6,571,354 B1 | * | 5/2003 | Parks et al. ..................... 714/7 |
| 7,133,966 B2 | * | 11/2006 | Sato et al. ..................... 711/114 |
| 2003/0061546 A1 | * | 3/2003 | Collins et al. .................. 714/42 |
| 2004/0260967 A1 | * | 12/2004 | Guha et al. ..................... 714/3 |
| 2005/0114728 A1 | * | 5/2005 | Aizawa et al. .................. 714/6 |
| 2005/0262385 A1 | * | 11/2005 | McNeill et al. ................ 714/5 |
| 2005/0283655 A1 | * | 12/2005 | Ashmore ....................... 714/7 |

OTHER PUBLICATIONS

Richard R. Muntz and John C.S. Lui, "Performance Analysis of Disk Arrays Under Failure", Proceedings of the 16th VLDB Conference, Brisbane, Australia, 1990, pp. 162-173.

* cited by examiner

*Primary Examiner*—Gabriel L Chu
(74) *Attorney, Agent, or Firm*—Blakely, Sokoloff, Taylor & Zafman LLP

(57) ABSTRACT

A method and system for rapidly recovering data from a failed disk in a RAID disk group are disclosed. According to one aspect of the present invention, a RAID-based storage system identifies a particular disk in a RAID disk group as a "dead" disk (e.g., incapable of servicing client-initiated requests in a timely manner). Accordingly, a spare disk is allocated to replace the "dead" disk and client-initiated read/write requests are directed to the spare disk for servicing. In addition, a disk-to-disk copy operation is initiated. Without overwriting valid data on the target disk with stale data from the "dead" disk, the disk-to-disk copy operation copies data from the "dead" disk to the target by directly reading data from the "dead" disk while reconstructing only the data that cannot be read directly from the "dead" disk.

26 Claims, 11 Drawing Sheets

96

IDENTIFY A PARTICULAR MASS STORAGE DEVICE IN A REDUNDANCY GROUP OF MASS STORAGE DEVICES AS "DEAD" (E.G., INCAPABLE OF SERVICING CLIENT-INITIATED ACCESS REQUESTS IN A TIMELY MANNER) 98

↓

ALLOCATE A TARGET MASS STORAGE DEVICE TO REPLACE THE "DEAD" MASS STORAGE DEVICE IN THE REDUNDANCY GROUP OF MASS STORAGE DEVICES 100

↓

INITIATE A DEVICE-TO-DEVICE COPY OPERATION TO COPY DATA FROM THE "DEAD" MASS STORAGE DEVICE TO THE TARGET MASS STORAGE DEVICE BY READING DATA DIRECTLY FROM THE "DEAD" MASS STORAGE DEVICE AND WRITING THE DATA TO THE TARGET MASS STORAGE DEVICE, WITHOUT OVERWRITING DATA ON THE TARGET MASS STORAGE DEVICE WITH STALE DATA FROM THE "DEAD" MASS STORAGE DEVICE 102

↓

UPON COMPLETION OF THE DEVICE-TO-DEVICE COPY OPERATION, TAKE THE "DEAD" MASS STORAGE DEVICE OUT OF SERVICE 104

↓

END

FIG. 7

(DEVICE-TO-DEVICE COPY OPERATION)

(CLIENT-INITIATED READ DURING A DEVICE-TO-DEVICE COPY OPERATION)

(CLIENT-INITIATED READ DURING A DEVICE-TO-DEVICE COPY OPERATION)

METHOD AND SYSTEM FOR RAPIDLY RECOVERING DATA FROM A "DEAD" DISK IN A RAID DISK GROUP

TECHNICAL FIELD

At least one embodiment of the present invention relates generally to a data storage system utilizing a redundant array of independent disks (RAID). More particularly, the present invention relates to a method and system for rapidly recovering data from a "dead" disk in a RAID disk group.

BACKGROUND

Over the years, disk drive performance and reliability has been continually increasing. Today's disk drives are faster, have greater storage capacities, consume less power, and have a longer service life than disk drives from only a few years ago. Despite the many improvements, however, modern disk drives are still prone to mechanical failure. Consequently, mechanisms for protecting against data loss due to disk failures are an essential requirement of modern day computer systems.

To protect against data loss due to disk failures, many system developers implement data storage systems based on a redundant array of independent disks, or RAID. RAID is a category of disk-based storage that employs two or more physical disk drives in combination to create one logical storage device, generally for the purpose of fault tolerance. There are a variety of RAID implementations, referred to as RAID Levels, each with its own particular set of characteristics. The more commonly implemented RAID Levels are selected for their performance and fault tolerance characteristics. In particular, most RAID-based data storage systems include the ability to recover "lost" data by reconstructing the "lost" data utilizing parity data.

For example, FIG. 1A illustrates a data storage sub-system 10 based on a RAID Level 4 implementation. The data storage sub-system 10 includes a RAID disk group with three independent disk drives (e.g., disk 1, 2 and 3) connected to a common RAID controller 12. As illustrated in FIG. 1A, disks 1 and 2 are dedicated to storing "stripes" of data, while disk 3 is dedicated to storing "stripes" of parity data. Accordingly, during a write operation, data is written to disks 1 and/or 2, while parity data is written to disk 3. If any one of the three disks fails, the data on the failed disk can be reconstructed using data from the other two disks.

The process of reconstructing "lost" data by combining data and parity data from other disks is generally referred to as data reconstruction. FIG. 1B illustrates a reconstruction operation for the data storage sub-system 10 illustrated in FIG. 1A. In FIG. 1B, disk 2 is shown with several bad disk blocks 14. If an attempt to access the bad disk blocks 14 on disk 2 fails during a read operation, the data from the bad disk blocks 14 on disk 2 can be reconstructed by combining data 16 from disk 1 and parity data 18 from disk 3. Moreover, if disk 2 fails completely, such that no data on disk 2 can be read, then a reconstruction operation can be initiated to reconstruct the entire data contents of disk 2.

In some RAID-based data storage systems, the reconstruction operation may be automated. For example, some RAID-based storage systems include "hot" spare disks that sit idle until needed. When a disk in a RAID disk group fails in some respect, a "hot" spare disk can automatically be swapped to take the place of the failed disk. Accordingly, the data storage system may automatically reconstruct the data from the failed disk and write the reconstructed data to the "hot" spare disk. The entire process happens seamlessly in the background while the data storage system continues to process read and write requests.

One problem with this solution is that it may be inefficient in the sense that the entire data contents of the failed disk are reconstructed, despite the possibility that only a small portion of data on the failed disk cannot be read directly from the disk. Because modern disk drives have relatively large storage capacities (e.g., 500 Gigabytes (GB)), reconstructing the entire data contents of a failed disk can take a long time and place a heavy computational burden on the data storage system. Moreover, the computational burden and the time it takes to reconstruct the data on a failed disk increases as the number of disks in the RAID disk group increases. Furthermore, the burden placed on the data storage system during the reconstruction operation causes system performance degradation. For example, it may take longer for the data storage system to service client-initiated read and write requests while the data from the failed disk is being reconstructed. Finally, the reconstruction operation may increase the likelihood that a second disk in the RAID disk group will fail—a situation referred to as a double disk error—thereby resulting in a situation in which data cannot be reconstructed.

Another problem with the solution described above is that the data on the failed disk may become stale before it is reconstructed and written to the spare disk. For example, the storage system may write new data to the spare disk while the data from the failed disk is being reconstructed. If data stored on the failed disk changes after the disk fails but before the data is reconstructed, the storage system may overwrite the new data on the spare disk with old data from the failed disk.

Other RAID-based storage systems depend on predictive failure analysis to predict when a disk is going to fail. For example, a RAID-based storage system may identify a disk as being likely to fail, and in response, initiate a procedure to reconstruct or copy data to a spare replacement disk. However, such systems generally depend on the ability of the failing disk to continue to service client-initiated disk access requests in a timely manner, which may not be possible for some portions of the disk. Furthermore, the efficiency of such systems is highly dependent on the ability to accurately detect when a disk is actually going to fail. For example, system resources may be wasted each time a disk is incorrectly identified as likely to fail.

Although the example storage system described above was shown to be using RAID Level 4, other RAID approaches have analogous drawbacks and limitations. For example, the problems described above exist for RAID 5, in which parity is distributed over all of the disks in a RAID array.

SUMMARY OF THE DESCRIPTION

A method and system for rapidly recovering data from a "dead" mass storage device in a redundancy group of mass storage devices are described. According to one aspect of the invention, a storage system having a redundancy group of mass storage devices identifies a particular mass storage device in the redundancy group as incapable of servicing client-initiated read and/or write requests in a timely manner (e.g., a "dead" mass storage device). In response, the storage system automatically allocates a spare mass storage device to replace the "dead" mass storage device in the redundancy group. In addition, the storage system initiates a device-to-device copy operation. The copy operation proceeds to copy data by reading data directly from the "dead" mass storage device and writing the data to the spare mass storage device without overwriting data on the spare mass storage device with stale data from the "dead" mass storage device. Furthermore, the storage system redirects client-initiated write requests initially directed to the "dead" mass storage device by forwarding such requests to the spare mass storage device.

BRIEF DESCRIPTION OF THE DRAWINGS

The present invention is illustrated by way of example, and not by way of limitation, in the figures of the accompanying drawings, in which like references indicate similar elements, and in which:

FIG. 7 illustrates a method, according to one embodiment of the invention, for rapidly recovering data from a "dead" mass storage device in a redundancy group of mass storage devices;

DETAILED DESCRIPTION

A method and system for rapidly recovering data from a "dead" disk in a RAID disk group are described. In the following description, for purposes of explanation, numerous specific details are set forth in order to provide a thorough understanding of the present invention. It will be evident, however, to one skilled in the art that the present invention may be practiced without these specific details.

In one embodiment of the invention, a RAID-based storage system identifies a particular disk in a RAID disk group as a "dead" disk. For example, a "dead" disk may be a disk that fails to service client-initiated disk access requests in a timely manner. Accordingly, the RAID-based storage system automatically selects a spare disk (e.g., a target disk) from a group of spare disks, and allocates the target disk to replace the "dead" disk in the RAID disk group. Moreover, the disk replacement procedure occurs without interrupting the storage system's normal operation, and in particular, its ability to service client-initiated access requests.

Once a target disk has been allocated, the RAID-based storage system initiates a disk-to-disk copy operation to copy data from the "dead" disk to the target disk by reading data directly from the "dead" disk and writing the data to the target disk. As will be described in greater detail below, during the disk-to-disk copy operation, the storage system copies data from the "dead" disk to the target disk without overwriting valid data on the target disk with stale data from the "dead" disk. Furthermore, the storage system reconstructs data from portions of the "dead" disk that cannot be read. By reconstructing only the data that cannot be read directly from the "dead" disk, the data recovery operation occurs more quickly and with less negative impact on the overall performance of the storage system.

Figure 1A:
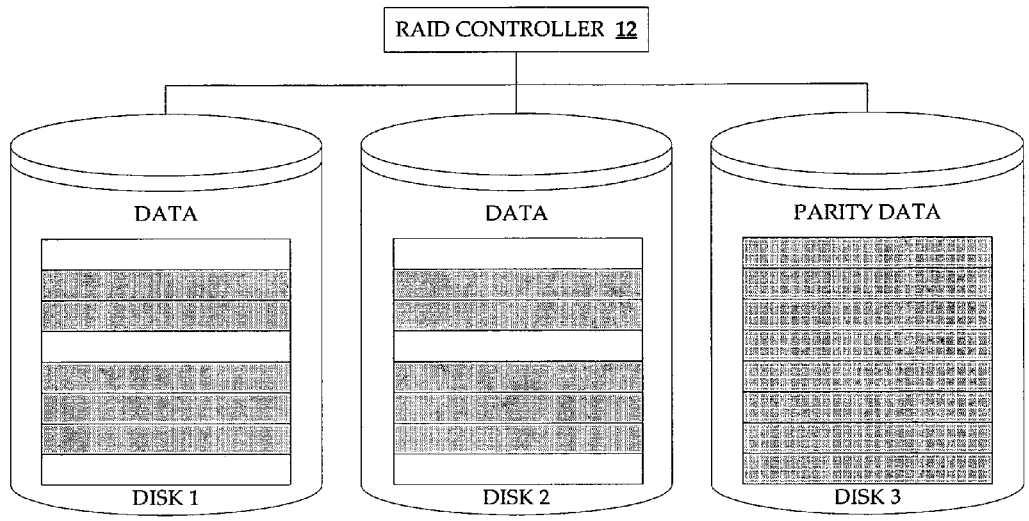
FIG. 1A illustrates a block diagram of a prior art RAID-based data storage sub-system with three independent disks arranged in a RAID disk group.
Figure 1B:
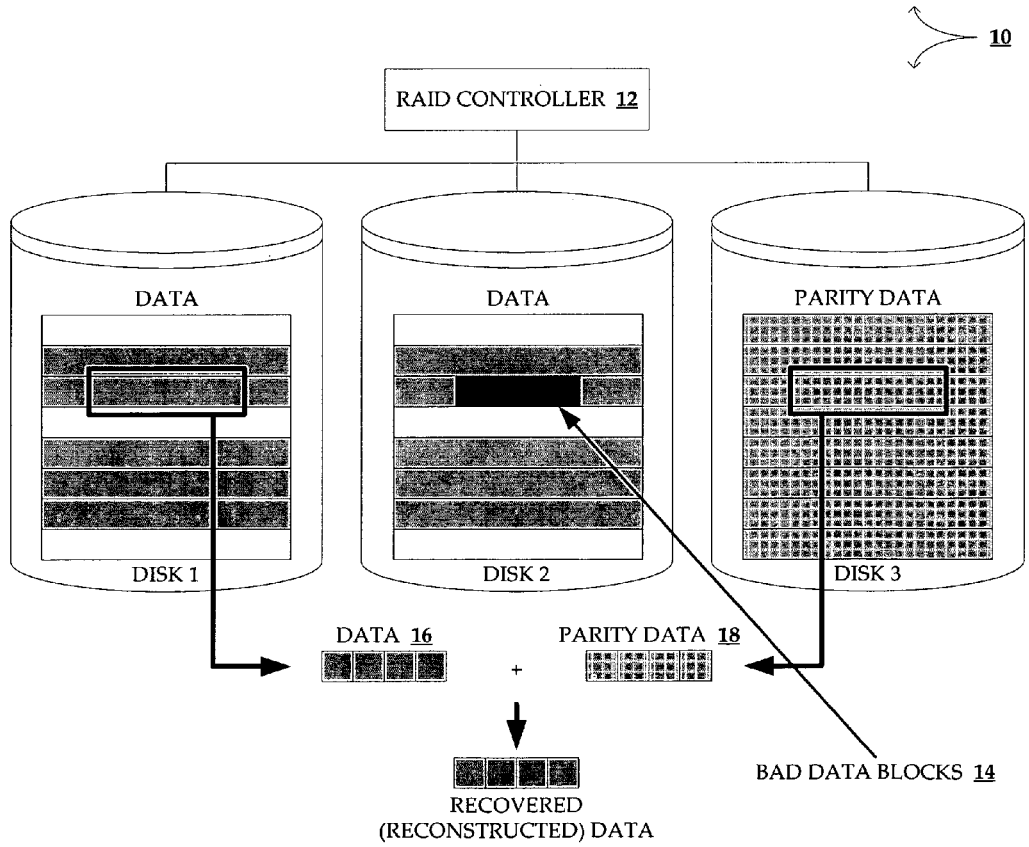
FIG. 1B illustrates a prior art method for reconstructing data from a bad data block in a RAID-based data storage sub-system with three independent disks forming a RAID disk group.
Figure 2:
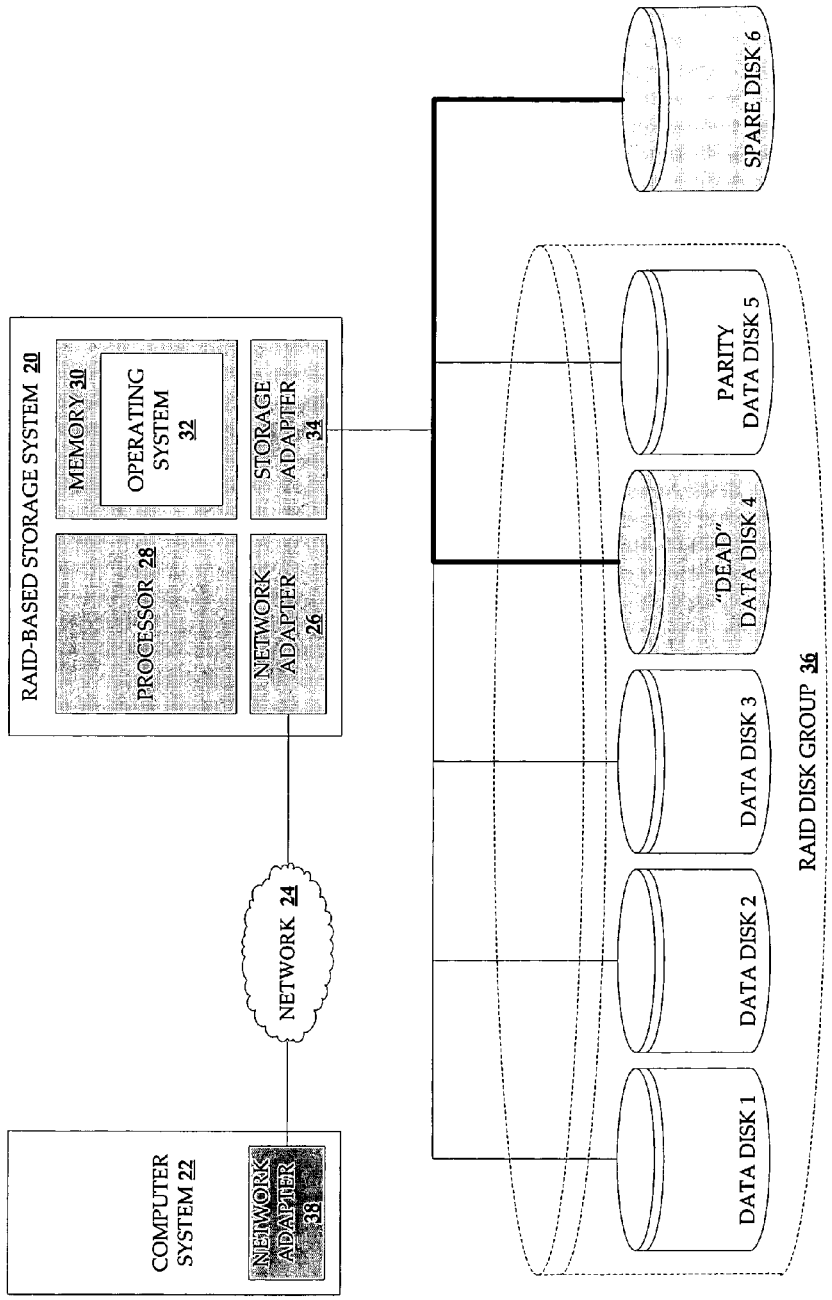
FIG. 2 illustrates an example of a RAID-based storage system, consistent with one embodiment of the invention, for providing data storage services.

FIG. 2 illustrates an example of a RAID-based storage system 20, consistent with one embodiment of the invention, for providing data storage services. As illustrated in FIG. 2, the RAID-based storage system 20 may be a special-purpose computer that provides data storage services to applications executing on one or more computer systems 22 connected to the storage system 20 via a network 24. Accordingly, the storage system 20 has a network adapter 26 that connects the storage system 20 to a network 24 for sending and receiving data. In addition, the storage system 20 has a processor 28 and a memory device 30 for executing a specialized storage-centric operating system 32 and various system software applications. The RAID-based storage system 20 may also have a specialized storage adapter 34 that connects the storage system 20 to several mass storage devices, such as electromagnetic disk drives, optical disk drives, or any other type of mass storage medium. As illustrated in FIG. 2, the storage adapter 34 connects the storage system 20 to six disks—five (e.g., disks 1, 2, 3, 4 and 5) of which are logically organized as a RAID disk group 36, or RAID volume, and one that is a spare disk (e.g., spare disk 6).

It will be appreciated by those skilled in the art that the present invention is applicable to a wide variety of RAID-based data storage systems. For example, in one embodiment of the invention, the RAID-based storage system 20 may be a network-attached storage (NAS) file server that provides file services to the computer system 22 connected via the network 24. Accordingly, in one embodiment of the invention, both the computer system 22 and the RAID-based storage system 20 include network adapters (e.g., network adapters 26 and 38) that communicate by sending and receiving files encapsulated as packets of data in accordance with one or more standard networking protocols, such as the Transfer Control Protocol and the Internet Protocol (e.g., TCP/IP), over an Ethernet-based network 24.

In an alternative embodiment of the invention, the RAID-based storage system 20 may provide block-level data storage services to one or more computer systems 22 over a local area network (LAN), a wide area network (WAN), or a storage area network (SAN). For example, block-level data may be communicated over a standard Ethernet network by encapsulating data and small computer system interface (SCSI) commands into IP-based data packets (e.g., iSCSI). Alternatively, the network adapter 38 of the computer system 22 may communicate data at the block-level over a network 24 based on a fibre channel architecture. In yet another embodiment of the invention, the RAID-based storage system 20 may provide both file and block-level data storage services.

In addition to being independent of any one particular type of data storage system (e.g., host-based, direct-attached, network-attached, etc.), the present invention may be implemented to function with various RAID implementations, generally referred to as RAID Levels. For example, in one embodiment of the invention, the RAID disk group 36 may be configured to operate based on RAID Level 4. Accordingly, one disk in the RAID disk group is dedicated to storing parity data. In another embodiment of the invention, a RAID disk group may be configured to operate based on RAID Level 5, such that parity data is dispersed across all disks in the RAID disk group. Those skilled in the art will appreciate that aspects of the present invention may be implemented in data storage systems based on other RAID Levels as well. Furthermore, the present invention is independent of the number of disks in any one RAID disk group. That is, in various embodiments of the invention, the number of disks forming a RAID disk group may vary.

Figure 3:
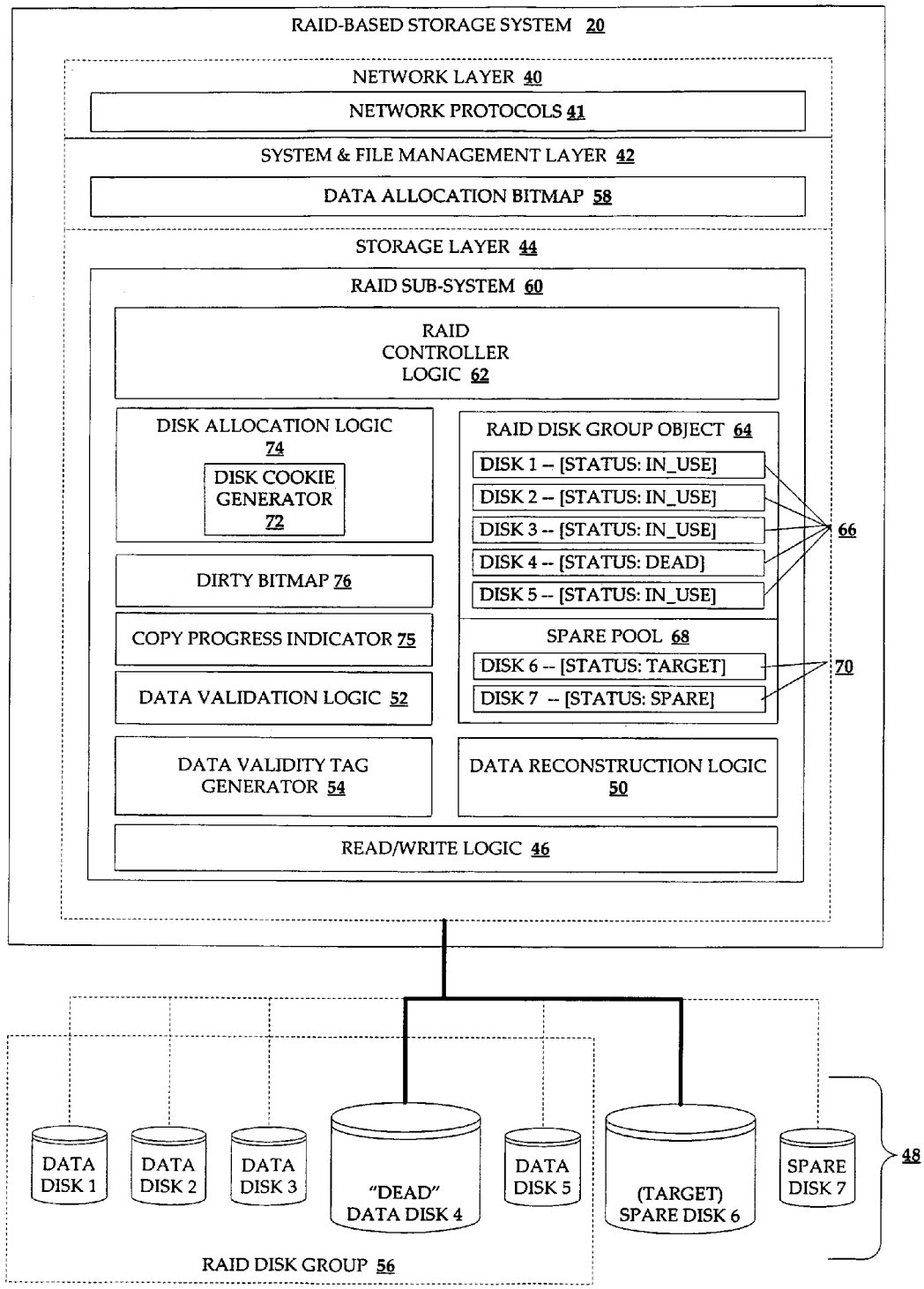
FIG. 3 illustrates a block diagram of the various functional components of a RAID-based storage system, according to one embodiment of the present invention.

FIG. 3 illustrates a block diagram of the various functional components of a RAID-based storage system 20, consistent with one embodiment of the present invention. As illustrated in FIG. 3, the RAID-based storage system 20 may be thought of as having three primary components or layers—a network layer 40, a system and file management layer 42, and a storage layer 44. However, it will be appreciated by those skilled in the art that in an alternative embodiment of the invention, one or more of these three primary layers (e.g., 40, 42, and 44) may be excluded. For example, aspects of the present invention may be implemented in a host-based system having a directly-attached storage (DAS) sub-system, thereby eliminating the need for a network layer 40.

It will be appreciated by those skilled in the art that the various functional components, which may be implemented in hardware, software, or a combination thereof, represent the algorithms and logic that provide the functionality of the present invention. For example, in one embodiment of the invention, the read/write logic 46, which facilitates the actual transfer of data between the storage system 20 and the various mass storage devices (e.g., disks 48), may be implemented as a device driver (e.g., software application) that controls a storage adapter with integrated RAID disk controller circuitry (e.g., hardware). Similarly, it will be appreciated by those skilled in the art that the functions of the other logical components, such as the data reconstruction logic 50, the data validation logic 52, and the data validity tag generation logic 54 may be implemented in hardware, software, or a combination thereof.

Referring again to FIG. 3, generally, the network layer 40 sends and receives data over a network. The network layer 40 supports one or more network protocols 41. Accordingly, in one embodiment of the invention, the network layer 40 may receive IP data packets containing a client-initiated request to read data from, or write data to, the storage system 20. For example, in the case of a client-initiated write request, the network layer 40 may receive the IP data packets, extract the write request, and forward the write request to the system and file management layer 42 along with data that represents a file that is to be written to one or more disks in the RAID disk group 56, or RAID volume. As described briefly above, the network from which the network layer 40 receives data may be a LAN, WAN or SAN.

In one embodiment of the invention, the system and file management layer 42 includes logic that implements a file system. For example, in one embodiment of the invention, the file management layer 42 includes a write anywhere file layout (WAFL®) file system, such as the NetApp® WAFL® file system commonly included in NAS filers from Network Appliance, Inc. of Sunnyvale, Calif. Accordingly, when the file management layer 42 receives a request to store (e.g., write) a file, the file management layer 42 first determines the disk and disk blocks to which the file is to be written. Similarly, when the file management layer 42 receives a request to read a file, the file management layer 42 first determines which disk and disk block (or blocks) contain the data that represents the requested file. Accordingly, one function of the file management layer 42 is mapping disk blocks to file data blocks.

In addition, the file management layer 42 may keep track of which disks and/or disk blocks contain valid data. For example, in one embodiment of the invention, the file management layer 42 includes a dirty bitmap 58 that indicates which disk blocks on a particular disk have been written with valid data and which disk blocks have not been written with valid data. For example, the dirty bitmap 58 may include one bit for every block on a disk. Each bit value (e.g., "1" or "0") in the bitmap determines whether or not a corresponding disk block has been written with valid data. In one embodiment, each disk is associated with its own dirty bitmap 58. It will be appreciated that the dirty bitmap 58 may be implemented as part of the system and file management layer 42, or alternatively, in one of the other layers. As will be described in further detail below, in one embodiment of the invention, the dirty bitmap 58 is updated each time a block of data is copied from a "dead" disk to a target disk during a device-to-device copy operation.

In one embodiment of the invention, the storage layer 44 includes a RAID sub-system 60 that manages the logical organization of numerous mass storage devices, such as disks 48, and controls the actual physical interface between the mass storage devices and the storage system 20. For example, the RAID sub-system 60 includes RAID controller logic 62 that keeps track of the logical organization of each disk attached to the storage system's 20 storage adapter, and in particular, the logical organization of one or more groups of disks forming a RAID disk group 56. For example, the RAID controller logic 62 manages one or more data objects that represent physical or logical storage devices. In FIG. 3, for example, the RAID controller logic 62 manages and/or controls the operation of each disk in the RAID disk group 56, as well as any spare disks (e.g., spare disk 6) that may be connected to the storage system's 20 storage adapter.

In addition, the RAID controller logic 62 may access portions of memory that contain data objects representing the RAID disk group 56 and each physical disk 48. Accordingly, each data object representing a disk 48 includes one or more bits (e.g., status bits) representing the state of the disk. For instance, the status bits of the data object representing a disk may indicate whether the disk is associated with a particular RAID disk group and/or what state the disk is in. In one embodiment, the RAID controller logic 62 includes a finite state machine (not shown) that controls the state of each disk based on one or more inputs received from either the file management layer 42, or some other component of the RAID sub-system 60. For example, in one embodiment of the invention, the state of a particular disk is changed from "IN_USE" to "DEAD" when it is determined that the particular disk has failed to respond to a client-initiated access request in a timely manner.

In FIG. 3, the RAID sub-system 60 is shown to have a RAID disk group object 64 including data objects 66 representing the five disks in the RAID disk group 56, which in turn make up an individual RAID volume. Each disk data object 66 is shown to include a status, which is determined by the bit values of one or more status bits. For example, disks 1, 2, 3 and 5 are shown to have a status of "IN_USE" while disk 4 is shown to have a status of "DEAD." In addition, the RAID sub-system 60 of FIG. 3 includes a data object representing a pool of spare disks 70 including individual data objects 68 representing spare disks 6 and 7.

In one embodiment of the invention, each disk data object 66 and 70 may include a unique disk cookie object. For example, in one embodiment of the invention, the RAID sub-system includes a disk cookie generator 72 as part of the disk allocation logic 74. Accordingly, as each disk is initially assigned to a RAID disk group, the disk cookie generator 72 generates a unique disk cookie value (e.g., bit sequence) for the disk. The disk allocation logic 74 then assigns the disk cookie to the disk, for example, when it changes the state of the disk from "SPARE" to "TARGET" or "TARGET" to "IN_USE." Accordingly, in one embodiment of the invention, each disk data object 66 in the RAID disk group object may have a group of bits that represent the disk's unique cookie. As will be described in greater detail below, in one embodiment of the invention, the unique disk cookie is utilized by a data validity tag generator 54 to generate a unique data validity tag for each data block written to a disk. Accordingly, in one embodiment of the invention, data validation logic reads a data validity tag associated with a particular data block in order to prevent the data block from being overwritten with stale data from a "dead" disk.

In the context of the present invention, a "dead" disk may be a disk that has been identified by the data storage system 20 as having failed in some respect. For example, a "dead" disk may not be able to uniformly service client-initiated disk accesses in a timely manner. However, despite exhibiting uncharacteristic behaviors, a dead disk will generally include significant portions of a data which can be directly read from the disk.

Those skilled in the art will appreciate the many known methods for determining that a particular disk is a "dead" disk. For example, in one embodiment of the invention, a disk may be determined to be a "dead" disk based on a single error received from the disk. Alternatively, the RAID sub-system 60 may include disk-error analyzing logic (not shown), which may analyze errors received from one or more disks. Accordingly, the disk-error analyzing logic makes the determination that a particular disk is "dead" based on a pattern of errors. In any case, it will be appreciated by those skilled in the art that a disk that has failed and has therefore been determined to be a "dead" disk, may still be able to respond to read requests. For example, many commercially available disks have a variety of operational parameters that are configurable to adjust the behavior and functionality of the disk. Consequently, portions of a disk which are not accessible in an optimal or normal operational mode, may be accessed in a different operational mode, such as a diagnostic or on-disk recovery mode. Accordingly, a disk that reports an error when attempting to access a disk block requested in a client-initiated read request may nonetheless be able to read the requested disk block in an alternative operational mode. In one embodiment of the invention, a "dead" disk operates in an operational mode other than its optimal or normal operational mode when servicing read requests associated with a disk-to-disk copy operation.

In one embodiment of the invention, once the state of a disk in the RAID disk group has been changed to "DEAD" and a target disk has been allocated, the RAID controller logic 62 initiates a disk-to-disk copy operation. The disk-to-disk copy operation facilitates the copying of data from the "dead" disk to the target disk. For example, the disk-to-disk copy operation systematically performs a read operation to read data on the "dead" disk, followed by a write operation to write the data to the target disk.

In one embodiment of the invention, the disk-to-disk copy operation may utilize a copy progress indicator 75 to indicate which data blocks from the "dead" disk have been copied to the target disk. For example, the copy progress indicator 75 may be incremented each time a block has been copied from the "dead" disk to the target disk. Accordingly, at any given time, the copy progress indicator 75 may be accessed to determine the address of the most recently copied disk block. As will be described in greater detail below, this is particularly useful for determining whether a client-initiated read request directed to a particular storage area (e.g., disk block) of the "dead" disk should be forwarded to the target disk for servicing during the disk-to-disk copy operation. For example, in one embodiment of the invention, if a client-initiated read request directed to the "dead" disk is received during the copy operation, the address of the requested disk block may be compared to the value of the copy progress indicator 75. Accordingly, if the address of the requested block is greater than the value of the copy progress indicator 75, then the data block has not yet been copied to the target disk, and the data is reconstructed. However, if the address of the requested block is less than or equal to the value of the copy progress indicator 75, then the data block has been copied to the target disk, and the client-initiated read request is forwarded to the target disk for servicing.

In one embodiment of the invention, if a read error occurs during a read operation associated with the disk-to-disk copy operation, the RAID controller logic 62 initiates a data reconstruction operation to reconstruct the data from the one or more disk blocks that cannot be read. For example, in one embodiment of the invention, the RAID-based storage system 20 includes data reconstruction logic 50 for reconstructing data that cannot be directly read from a "dead" disk during a disk-to-disk copy operation. The data reconstruction logic 50 may read data from all disks in the RAID disk group other than the "dead" disk, and then reconstruct the "lost" data, for example, by performing a series of XOR operations on the data. One skilled in the relevant art will appreciate the many known algorithms for performing a RAID data reconstruction operation. Accordingly, the disk-to-disk copy operation may copy data by reading data directly from the "dead" disk when possible, and reconstructing only the data that cannot be read. By reconstructing data from only the portions of the "dead" disk that cannot be read, the copy operation proceeds more quickly and with less negative impact on the storage system 20.

In the event that a "dead" disk has some type of catastrophic failure during the disk-to-disk copy operation such that the "dead" disk can no longer be accessed, the data reconstruction logic 50 may begin reconstructing data from the "dead" disk at the point where the disk-to-disk copy operation ended. For example, rather than reconstructing the entire data contents of the "dead" disk, the data reconstruction logic 50 may reconstruct only the data on the portion of the "dead" disk that was not copied to the target disk during the time that the disk-to-disk copy operation was executing.

In one embodiment of the invention, the disk-to-disk copy operation occurs concurrently with one or more client-initiated read or write operations. For example, the disk-to-disk copy operation may operate so as to limit any interference with the normal operation of the RAID-based storage system. In one embodiment of the invention, the RAID controller logic 62 prioritizes read and write requests by giving client-initiated read and write requests higher priority than internally generated read and write requests associated with a disk-to-disk copy operation. Although, the disk-to-disk copy operation may potentially increase the response time of the storage system, a disk-to-disk copy operation involves significantly less computation than a RAID data reconstruction operation, and is therefore faster than a RAID data reconstruction operation.

Figure 4:
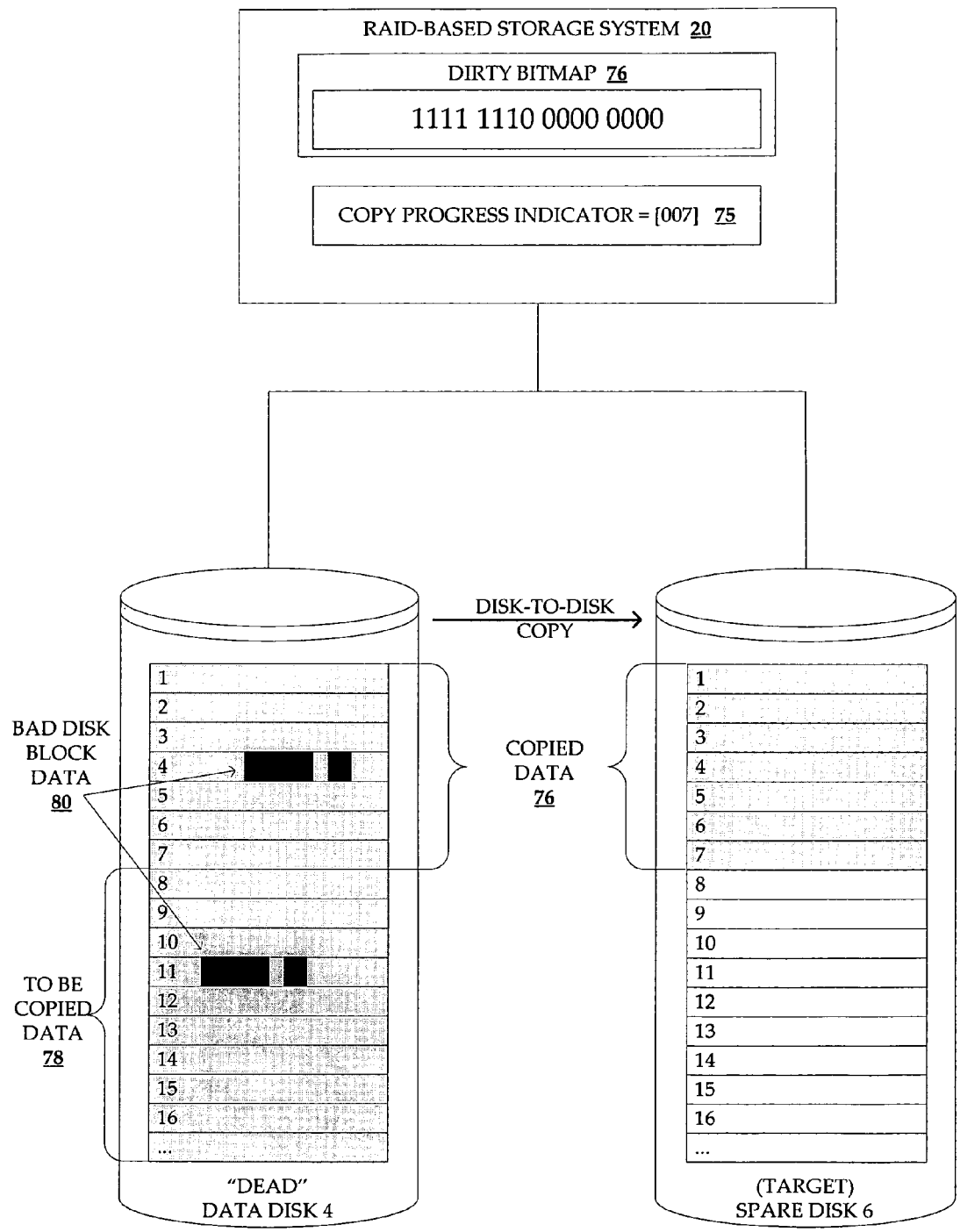
FIG. 4 illustrates a RAID-based storage system in the process of copying data from a "dead" disk to a target disk in connection with a disk-to-disk copy operation, according to one embodiment of the invention.

FIG. 4 illustrates a RAID-based storage system 20 in the process of copying data from a "dead" disk (e.g., data disk 4) to a target disk (e.g., spare disk 6) in connection with a disk-to-disk copy operation, according to one embodiment of the invention. In FIG. 4, the numbered blocks represent disk blocks of the "dead" disk and the target disk. Accordingly, as illustrated in FIG. 4, the disk-to-disk copy operation has successfully copied data from disk blocks 1 through 7 (e.g., copied data 76) of the "dead" disk to the corresponding disk blocks of the target disk. Disk blocks 8 through 16 have yet to be copied from the "dead" disk to the target disk (e.g., to be copied data 78).

In one embodiment of the invention, the disk-to-disk copy operation systematically copies data from the "dead" disk to the target disk by reading data from a disk block of the "dead" disk, and then writing the data to a corresponding disk block of the target disk. Accordingly, during a disk-to-disk copy operation, the RAID-based storage system 20 may first forward an internally generated read request to the "dead" disk. After the storage system 20 has received the requested data from the "dead" disk, the storage system 20 may forward an internally generated write request to the target disk. If the write request is successfully serviced by the target disk, the storage system 20 increments the copy progress indicator 75. For example, as illustrated in FIG. 4, the copy progress indicator 75 has been updated to store a value of "007", indicating that data block 7 has been successfully copied from the "dead" disk to the target disk. Consequently, if a client-initiated read request directed to block 7 of the "dead" disk is received, the storage system 20 will forward the request to the target disk because the copy progress indicator 75 indicates that block 7 has already been copied to the target disk. For example, in one embodiment, the storage system 20 may perform a simple comparison operation to compare the address of the requested data block to the value of the copy progress indicator 75. If the address of the requested block (e.g., block 7) is less than or equal to the copy progress indicator (e.g., 7), then the storage system will forward the client-initiated read request to the target disk for servicing.

In FIG. 4, disk blocks 4 and 11 of the "dead" disk represent bad disk blocks 80. For example, the data stored in disk blocks 4 and 11 may not be readable by the disk. Consequently, when the storage system 20 forwards a read request directed to disk block 11 of the "dead" disk, the "dead" disk may return an error indicating that disk block 11 cannot be read. Accordingly, in one embodiment of the invention, the storage system 20, upon receiving a read error associated with a read request in connection with a disk-to-disk copy operation, initiates a data reconstruction operation to reconstruct data that cannot be read from the "dead" disk (e.g., disk blocks 4 and 11). After reconstructing the data at disk block 11, the storage system 20 generates a data validity tag associated with the reconstructed data, and writes the data validity tag and the reconstructed data to the disk block of the target disk that corresponds with the disk block of the "dead" disk from which the data was read.

In one embodiment of the invention, the storage system 20 may include a dirty bitmap 58 to track which portions of the target disk have been written with valid data. Accordingly, each time data is written to the target disk in connection with the disk-to-disk copy operation, the dirty bitmap 58 is updated to indicate the particular blocks that contain valid data. For example, in one embodiment of the invention, a bit is set to "1" (e.g., logical one) to indicate that the disk block corresponding to that bit has been written with valid data. As illustrated in FIG. 4, the bits of the dirty bitmap 58 corresponding to disk blocks 1 through 7 have been set with a "1", indicating that blocks 1 through 7 of the target disk contain valid data. Consequently, if a client-initiated read request directed to a block with a set bit is received by the storage system 20, the storage system 20 can automatically direct the read request to the target disk for servicing.

Figure 5:
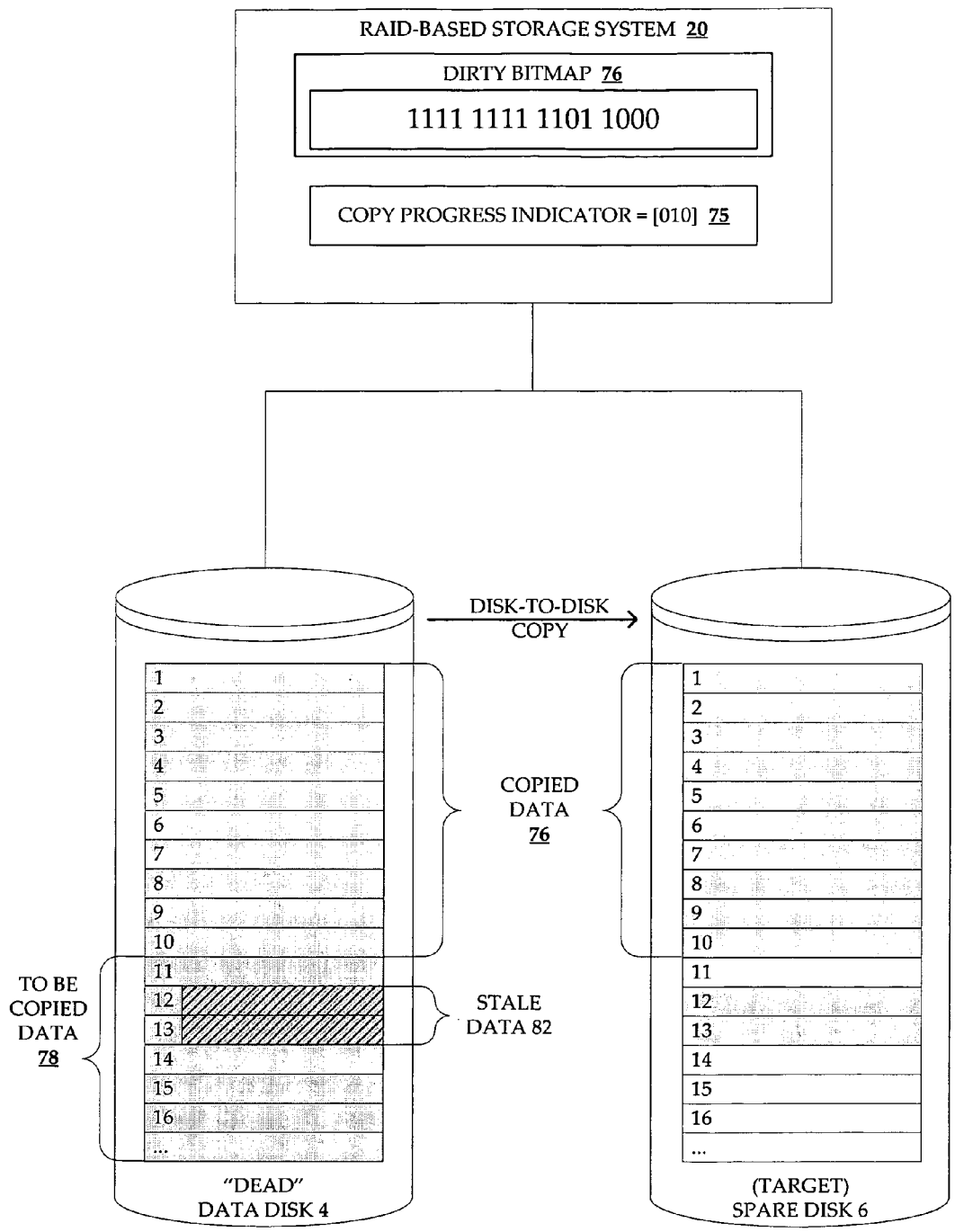
FIG. 5 illustrates a RAID-based storage system in the process of copying data from a "dead" disk to a target disk, without overwriting data on the target disk with stale data from the "dead" disk, according to one embodiment of the invention.

FIG. 5 illustrates a RAID-based storage system 20 in the process of copying data from a "dead" disk to a target disk without overwriting data on the target disk with stale data from the "dead" disk. In FIG. 5, disk blocks 12 and 13 of the "dead" disk represent disk blocks storing stale data 82. In one embodiment of the invention, the data on the "dead" disk may become stale when one of two things happens. First, during the disk-to-disk copy operation, the storage system 20 may receive a client-initiated write request directed to a disk block of the "dead" disk that has not yet been copied to the target disk (e.g., disk blocks 11 through 16. Accordingly, the storage system 20 redirects the client-initiated write request to the target disk by forwarding the client-initiated write request to the target disk for servicing. Once the data has been written to a corresponding disk block of the target disk, the data at the corresponding disk block of the "dead" disk becomes stale. As illustrated in FIG. 5, disk blocks 12 and 13 on the target disk represent new and valid data that has been written to the target disk subsequent to the allocation of the target disk and the initiation of the disk-to-disk copy operation.

Another way in which data on the "dead" disk may become stale is during a client-initiated read request. For example, this may occur when the storage system 20 receives a client-initiated read request directed to a disk block of the "dead" disk that has not yet been copied to the target disk (e.g., disk blocks 11 through 16) as part of the disk-to-disk copy operation. Accordingly, the storage system 20 reconstructs the data from the requested disk block of the "dead" disk, and provides the reconstructed data to the client. In addition, the storage system 20 writes the reconstructed data to the target disk so that the data need not be copied by the disk-to-disk copy operation, thereby eliminating an extra read operation. An operation in which reconstructed data is written to a target disk in response to a read request is sometimes referred to as a piggy-back operation. However, after the data has been written to a disk block of the target disk, the corresponding disk block of the "dead" disk will contain stale data. Consequently, it is important that the disk-to-disk copy operation avoid overwriting valid data on the target disk with stale data from the "dead" disk.

In one embodiment of the invention, the disk-to-disk copy operation avoids overwriting disk blocks of the target disk with stale data from the "dead" disk. For example, referring to FIG. 5, the disk-to-disk copy operation will avoid overwriting disk blocks 12 and 13 of the target disk with the stale data from disk blocks 12 and 13 of the "dead" disk. In one embodiment of the invention, during a disk-to-disk copy operation, after the storage system 20 has read data from a disk block of the "dead" disk but before the storage system 20 has written the data to the corresponding disk block of the target disk, the storage system 20 reads a data validity tag from the corresponding disk block of the target disk. The data validity tag indicates whether the data currently at the corresponding disk block of the target disk is valid. For example, as described in greater detail with respect to the description of FIG. 6, in one embodiment of the invention, each data block written to a disk block has a header portion that may contain, among other things, a data validity tag. Accordingly, data validation logic 52 on the storage system 20 may determine the validity of the data that is at the disk block of the target disk before the disk block is overwritten with stale data during the disk-to-disk copy operation.

In another embodiment of the invention, a dirty bitmap 58 is used to ensure that valid data on the target disk is not overwritten with stale data from the "dead" disk during a disk-to-disk copy operation. For example, the system and file management layer 42 may include a dirty bitmap 58 indicating which portions of the target disk have been written with valid data. At the time the target disk is allocated, for example, the dirty bitmap 58 may be set to a predetermined initial value. For example, the dirty bitmap 58 may be zeroed out so that every bit is "0" (e.g., a logical zero), indicating that no disk blocks on the target disk contain valid data. However, as the disk-to-disk copy operation proceeds, the storage system 20 will update the dirty bitmap 58 as valid data is written to the target disk. Similarly, as data is written to the target disk as a result of client-initiated write requests and read requests, the dirty bitmap 58 will be updated to indicate the exact disk blocks on the target disk that contain valid data. Consequently, during the disk-to-disk copy operation, data validation logic 52 analyzes the dirty bitmap 58 to determine whether a particular disk block on the target disk contains valid data, before the disk-to-disk copy operation reads data from the "dead" disk.

It will be appreciated by those skilled in the art that the size of the dirty bitmap 58 may be extremely large if it contains one bit for every disk block on the disk. Accordingly, the dirty bitmap 58 may be implemented at a granularity that is less than one-to-one. For example, in one embodiment of the invention, the dirty bitmap 58 may have one bit for a group of disk blocks on the target disk. Accordingly, a set bit in the dirty bitmap 58 may indicate that at least one disk block, within a particular group of disk blocks, contains valid data. Consequently, during a disk-to-disk copy operation, if the dirty bitmap 58 indicates a disk block in the group contains valid data, then prior to writing data to any disk block in the particular group associated with the set bit, the storage system 20 reads a data validity tag from the particular disk block of the target disk to which data is to be written.

Figure 6:
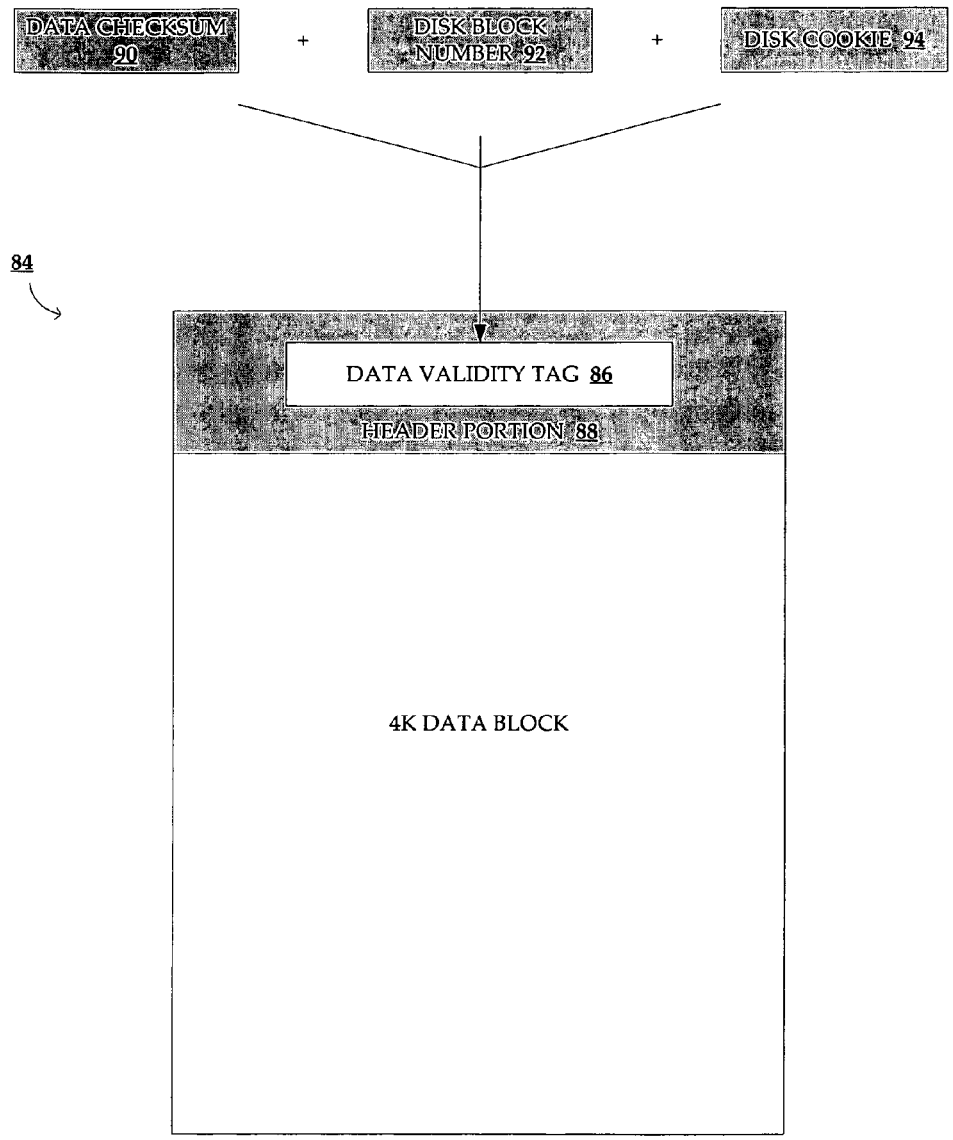
FIG. 6 illustrates a data block including a data validity tag, consistent with one embodiment of the invention.

FIG. 6 illustrates a data block 84 including a data validity tag 86, consistent with one embodiment of the invention. As illustrated in FIG. 6, a data validity tag 86 may be included in the header portion 88 of each data block that is written to a disk block of a disk in a RAID disk group. In one embodiment of the invention and as illustrated in FIG. 6, the data validity tag 86 is calculated at least in part based on a data checksum 90, a disk block number 92, and a disk cookie 94, or mass storage device identifier. The disk cookie 94 may be a globally unique number or bit sequence that is generated and assigned at the time a disk is allocated. Because the disk cookie 94 is assigned to the disk at the time the target disk is allocated and made a part of the RAID disk group, any data that is on the target disk at the time it is allocated will not have a data validity tag based on the disk cookie 94. Consequently, the data validation logic 52 of the storage system 20 can distinguish valid data from invalid data based on the data validity tag 86. It will be appreciated by those skilled in the art that other forms of data validity tags 86 may be used. For example, in an alternative embodiment, a time stamp may be used as a data validity tag 86. Accordingly, the time stamp may indicate whether a particular data block was written to the target disk before or after the target disk was allocated to the RAID disk group. For example, the time at which the disk was allocated might be compared with the time stamp. In such a scenario, valid data would include data with a time stamp that indicates the data was written to the target disk at a time subsequent to the time at which the target disk was allocated.

FIG. 7 illustrates a method 96, according to one embodiment of the invention, for rapidly recovering data from a "dead" mass storage device (e.g., a disk) in a redundancy group of mass storage devices (e.g., a RAID disk group). At operation 98, a storage system identifies a particular mass storage device in a redundancy group of mass storage devices as "dead." For example, the particular mass storage device may be identified as "dead" as the result of one or more read errors reported to the storage system by the particular mass storage device. Alternatively, the storage system may experience a time-out event waiting for the particular mass storage device to return data in connection with a client-initiated read request directed to the particular mass storage device. In any case, at operation 100, in response to identifying the particular mass storage device as "dead", the storage system allocates a replacement mass storage device (e.g., a target mass storage device), selected from a group of spare mass storage devices. The allocation of the target mass storage device may happen on the fly, without interfering with the normal operation of the storage system.

After a target mass storage device has been selected to replace the "dead" mass storage device in the redundancy group, at operation 102, the storage system initiates a device-to-device copy operation to copy data from the "dead" mass storage device to the target mass storage device. For example, the storage system systematically reads data from a particular storage area of the "dead" mass storage device, and then writes the data to the corresponding storage area of the target mass storage device. In one embodiment of the invention, before writing data to the corresponding storage area of the target mass storage device, the device-to-device copy operation determines whether the data stored at the storage area of the "dead" mass storage device is stale.

At operation 104, after all of the data from the "dead" mass storage device has been copied to the target mass storage device, the "dead" mass storage device is taken out of service so that it can be removed from the storage system. For example, in one embodiment of the invention, the logical state of the "dead" mass storage device is changed from "DEAD" to "OUT_OF_SERVICE" or some other state which allows an administrator to physically remove the mass storage device from the system.

Figure 8:
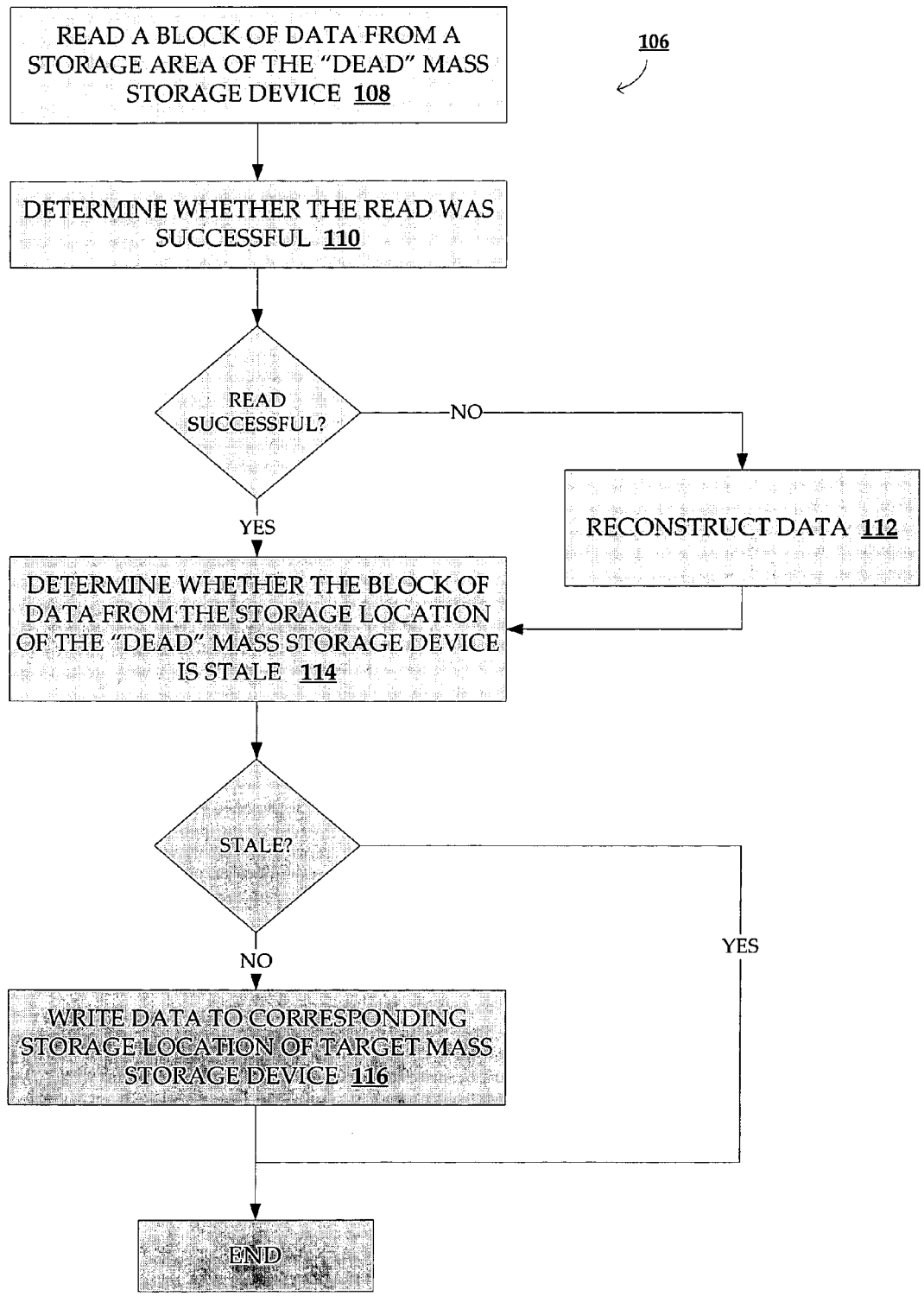
FIG. 8 illustrates a method, according to one embodiment of the invention, for copying data from a "dead" mass storage device to a target mass storage device in connection with a device-to-device copy operation.

FIG. 8 illustrates a method 106, according to one embodiment of the invention, for copying data from a "dead" mass storage device to a target mass storage device in connection with a device-to-device copy operation. At operation 108, the storage system forwards a read request for a particular storage area to the "dead" mass storage device. Next, at operation 110 the storage system determines whether the read operation was successful. If the requested data could not be read from the "dead" mass storage device, the storage system, at operation 112, initiates a data reconstruction operation to reconstruct the data that could not be read.

Next, at operation 114, the storage system determines whether the data, either reconstructed or successfully read from the "dead" mass storage device, is stale. In alternative embodiments of the invention, there are various methods that may be utilized to determine whether data on the "dead" mass storage device is stale. For example, in one embodiment of the invention, after reading data from the "dead" mass storage device but prior to writing the data to the target mass storage device, the storage system may read data from the corresponding storage area of the target mass storage device to which the data is to be written. After the storage system reads the data from the target mass storage device, the storage system may analyze a data validity tag to determine whether the data currently at the storage area of the mass storage device is valid. If valid, the storage system will abort the copy operation for that particular data block, and proceed to read the next data block from the "dead" mass storage device.

In an alternative embodiment, data staleness may be determined by analyzing a dirty bitmap. Utilizing a dirty bitmap is advantageous because the staleness determination may be made prior to reading data from the "dead" mass storage device. For example, in one embodiment of the invention, each time data is written to a particular storage area of the target mass storage device, a bit corresponding to that particular storage area is set in a dirty bitmap. Accordingly, prior to reading data from the "dead" mass storage device (e.g., operation 108), the dirty bitmap may be analyzed to determine whether the particular storage area of the target mass storage device to be written contains valid data. If the corresponding storage area of the target mass storage device contains valid data, then the copy operation is aborted with respect to that particular block of data even before the particular data block is read from the "dead" mass storage device.

In any case, if the corresponding storage area of the target mass storage device does not contain valid data, then the storage system, at operation 116, forwards a write request to the target mass storage device directing the target mass storage device to write the data to the corresponding storage area. It will be appreciated that the device-to-device copy operation may continue until all data from the "dead" mass storage device has been successfully written to the target mass storage device.

Figure 9:
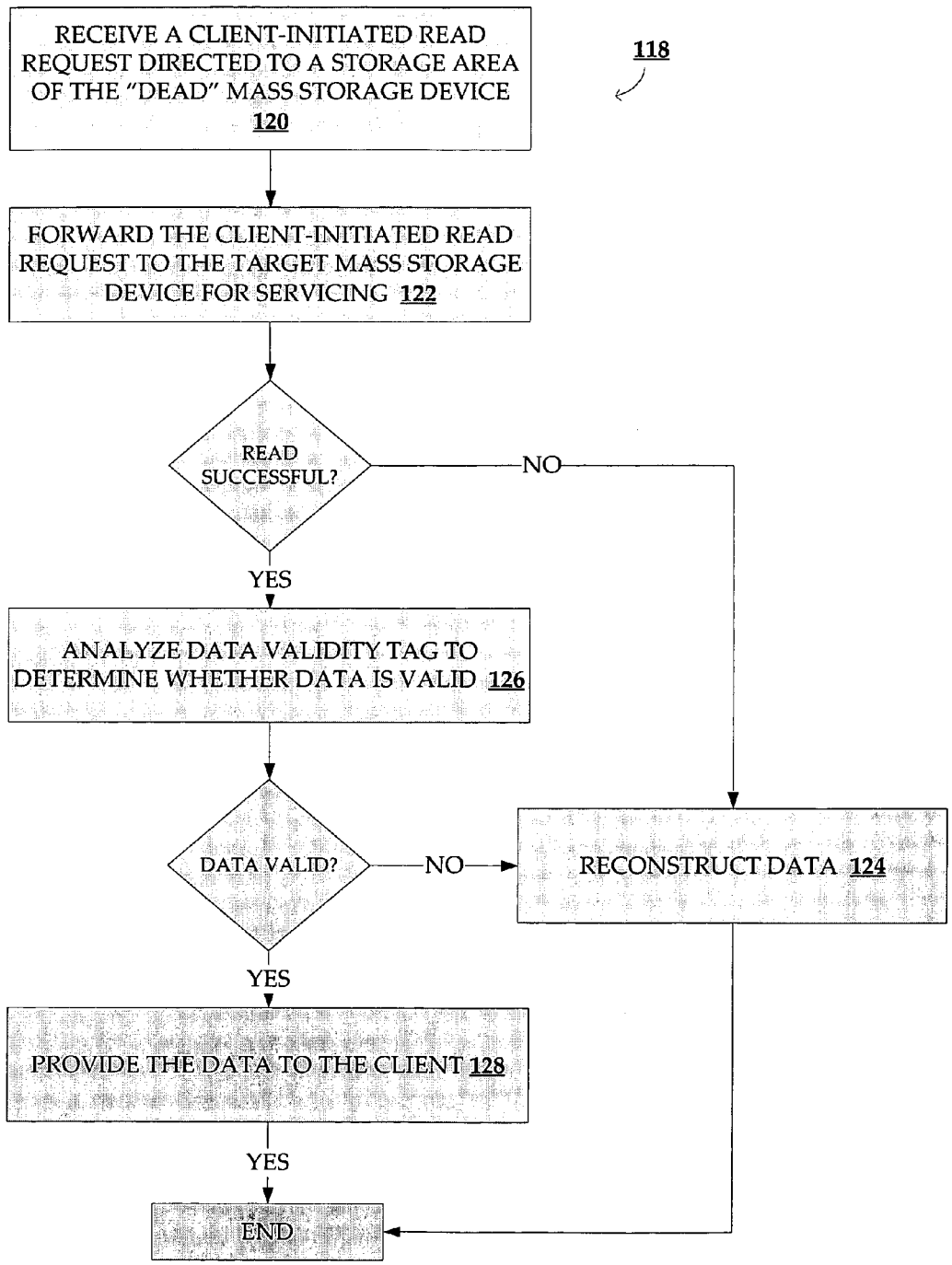
FIG. 9 illustrates a method, according to one embodiment of the invention, for handling a client-initiated read request during a device-to-device copy operation.

FIG. 9 illustrates a method 118, according to one embodiment of the invention, for handling a client-initiated read request during a device-to-device copy operation. For example, in one embodiment of the invention, after the storage system has identified a particular mass storage device in a redundancy group as a "dead" mass storage device, the storage system allocates a target mass storage device to replace the "dead" mass storage device. Next, the storage system initiates a device-to-device copy operation to copy data from the "dead" mass storage device to the target mass storage device. Accordingly, during the device-to-device copy operation, at operation 120 the storage system receives a client-initiated read request directed to the "dead" mass storage device. Rather than forward the client-initiated read request to the "dead" mass storage device for servicing, the storage system, at operation 122, forwards the client-initiated read request to the target mass storage device for servicing.

If the read operation at the target mass storage device was unsuccessful, the storage system initiates a data reconstruction operation 124 to reconstruct the data. However, if the read operation succeeded, then at operation 126 the storage system analyzes a data validity tag included in the header of the data block read from the target mass storage device to determine whether the data block read is valid. For example, the data may be invalid if it has not yet been copied from the "dead" mass storage device to the target mass storage device. Accordingly, if invalid, at operation 124 the storage system initiates a data reconstruction operation to reconstruct the data from the "dead" mass storage device. However, if the data validity tag indicates the data read from the target is valid, then at operation 128 the data is provided to the client.

Figure 10:
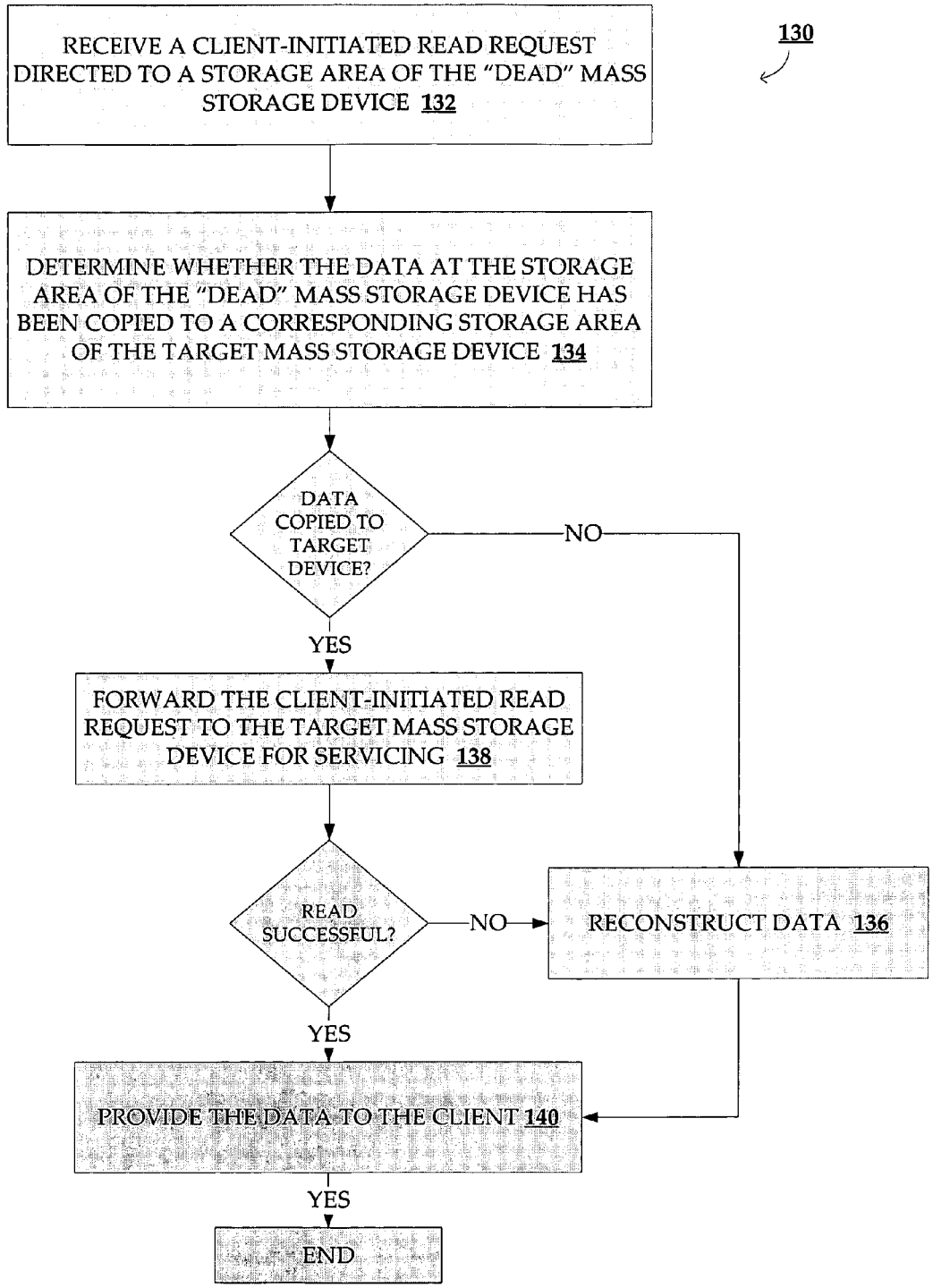
FIG. 10 illustrates a method, according to one embodiment of the invention, for handling a client-initiated read request during a device-to-device copy operation.

FIG. 10 illustrates an alternative method 130, according to one embodiment of the invention, for handling a client-initiated read request during a device-to-device copy operation. At operation 132, the storage system receives a client-initiated read request directed to a particular storage area of the "dead" mass storage device. Rather than forward the client-initiated read request to the "dead" mass storage device for servicing, the storage system, at operation 134, first determines whether the data at the storage area of the "dead" mass storage device has been copied to the corresponding storage area of the target mass storage device. For example, in one embodiment of the invention, the storage system may compare the address of the requested data to the value of a copy progress indicator. If the value of the copy progress indicator is less than or equal to the address of the requested data block, then at operation 136 the storage system forwards the client-initiated read request to the target mass storage device for servicing. Assuming the data is successfully read from the target mass storage device, at operation 138 the data is provided to the client. However, if the value of the copy progress indicator is greater than the address of the requested data block, then the storage system initiates a data reconstruction operation 140 to reconstruct the data from the "dead" mass storage device.

In an alternative embodiment, a dirty bitmap may be utilized at operation 134 to determine whether the data at the "dead" mass storage device has been copied to the target mass storage device. For example, a dirty bitmap may be used to indicate which storage areas of the target mass storage device contain valid data. Accordingly, if the bit in the dirty bitmap corresponding to the requested storage area is set, the storage system forwards the client-initiated read request to the target mass storage device for servicing. However, if the bit in the dirty bitmap corresponding to the address of the requested block is not set, then a data reconstruction operation 136 is initiated.

It will be appreciated by those skilled in the art that various features described above may be used in combination when servicing a client-initiated read during a device-to-device copy operation. For example, in one embodiment of the invention, the determination of whether valid data exists at a particular storage area of the target mass storage device may be involve analyzing both a copy progress indicator and a dirty bitmap.

Figure 11:
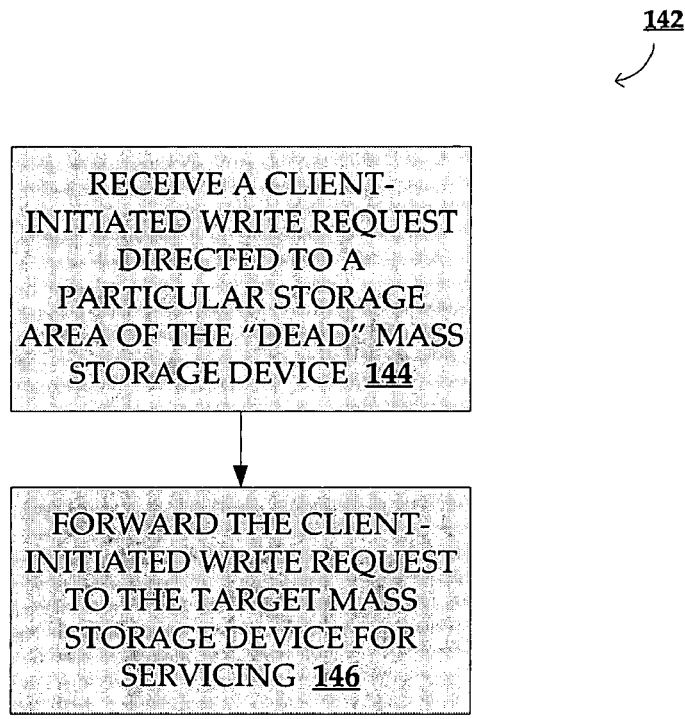
FIG. 11 illustrates a method, according to one embodiment of the invention, for handling a client-initiated write request during a device-to-device copy operation.

FIG. 11 illustrates a method 142, according to one embodiment of the invention, for handling a client-initiated write request during a device-to-device copy operation. In one embodiment of the invention, after a target mass storage device has been allocated to replace a mass storage device in a redundancy group that has been determined to be "dead," the storage system continues to service client-initiated read and write requests. Accordingly, at operation 144 the storage system receives a write request directed to a particular storage area of the "dead" mass storage device. At operation 146, the client-initiated write request is forwarded to the target mass storage device for servicing.

Thus, a method is provided with reference to specific exemplary embodiments. It will be evident that various modifications and changes may be made to theses embodiments without departing from the broader spirit and scope of the invention. Accordingly, the specification and drawings are to be regarded in an illustrative rather than a restrictive sense.

What is claimed is:

1. A method comprising:
responsive to identifying a particular mass storage device in a redundancy group of mass storage devices as incapable of servicing client-initiated requests in a timely manner:

automatically allocating a spare mass storage device to replace the particular mass storage device in the redundancy group of mass storage devices;

generating a disk cookie for the spare mass storage device, the disk cookie used to generate a data validity tag for indicating the validity of data written to the spare mass storage device;

forwarding client-initiated write requests directed to the particular mass storage device to the spare mass storage device for servicing; and initiating a device-to-device copy operation to systematically read data from the particular mass storage device and write the data to the spare mass storage device without overwriting data on the spare mass storage device with stale data from the particular mass storage device.

2. The method of claim 1, wherein the device-to-device copy operation to systematically read data from the particular mass storage device and write data to the spare mass storage device without overwriting data on the spare mass storage device with stale data from the particular mass storage device includes:

reading data from a storage area of the particular mass storage device;

reading a data validity tag from a corresponding storage area of the spare mass storage device; and writing the data from the storage area of the particular mass storage device to the corresponding storage area of the spare mass storage device only if the data validity tag indicates data at the corresponding storage area of the spare mass storage device is invalid.

3. The method of claim 2, wherein writing the data from the storage area of the particular mass storage device to the corresponding storage area of the spare mass storage device includes:

generating a data validity tag associated with data to be written to the corresponding storage area of the spare mass storage device; and writing the data validity tag to the corresponding storage area of the spare mass storage device when writing the data from the storage area of the particular mass storage device to the corresponding storage area of the spare mass storage device.

4. The method of claim 2, further comprising:

if the particular mass storage device fails to read data from the storage area of the particular mass storage device in connection with a read request associated with the device-to-device copy operation, reconstructing the data from the storage area of the particular mass storage device;

generating a data validity tag associated with the reconstructed data; and writing the data validity tag and the reconstructed data to a corresponding storage area of the spare mass storage device.

5. The method of claim 1, wherein the device-to-device copy operation to systematically read data from the particular mass storage device and write data to the spare mass storage device without overwriting data on the spare mass storage device with stale data from the particular mass storage device includes:

for each storage area storing data to be copied from the particular mass storage device to the spare mass storage device, analyzing a dirty bitmap indicating storage areas of the spare mass storage device to which valid data has been written; and for each storage area storing data to be copied from the particular mass storage device to the spare mass storage device, copying data from the storage area of the particular mass storage to a corresponding storage area of the spare mass storage device only if the dirty bitmap indicates that the corresponding storage area of the spare mass storage device is not storing valid data.

6. The method of claim 5, wherein copying data from the storage area of the particular mass storage device to a corresponding storage area of the spare mass storage device includes:

reading data from the storage area of the particular mass storage device;

generating a data validity tag based in part on a disk cookie associated with the spare mass storage device, and writing the data validity tag and the data from the storage area of the particular mass storage device to the corresponding storage area of the spare mass storage device.

7. The method of claim 1, further comprising:

during the device-to-device copy operation, receiving a client-initiated read request directed to a storage area of the particular mass storage device;

responsive to receiving the client-initiated read request directed to a storage area of the particular mass storage device, determining whether data at a corresponding storage area of the spare mass storage device is valid; and if data at the corresponding storage area of the spare mass storage device is valid, forwarding the client-initiated read request to the spare mass storage device for servicing.

8. The method of claim 7, wherein determining whether data at a corresponding storage area of the spare mass storage device is valid includes comparing an address for the storage area of the particular mass storage device with a copy progress indicator value to determine whether the data at the corresponding storage area of the spare mass storage device is valid.

9. The method of claim 7, wherein determining whether data at a corresponding storage area of the spare mass storage device is valid includes analyzing a dirty bitmap, the dirty bitmap indicating which storage areas of the spare mass storage device contain valid data.

10. The method of claim 1, further comprising:

during the device-to-device copy operation, receiving a client-initiated read request directed to a storage area of the particular mass storage device;

responsive to receiving the client-initiated read request directed to a storage area of the particular mass storage device, determining whether data at a corresponding storage area of the spare mass storage device is valid; and if data at the corresponding storage area of the spare mass storage device is not valid, reconstructing the data at the storage area of the particular mass storage device.

11. The method of claim 10, further comprising:

after reconstructing the data at the storage area of the particular mass storage device, generating a data validity tag associated with the reconstructed data, and writing the data validity tag and the reconstructed data to a corresponding storage area of the spare mass storage device.

12. A storage system comprising:

controller logic to automatically allocate a spare mass storage device to replace a particular mass storage device in a redundancy group of mass storage devices in response to identifying the particular mass storage device as incapable of servicing client-initiated access requests in a timely manner;

data validity tag generation logic to generate data validity tags to indicate the validity of data written to the spare mass storage device, the data validity tags based at least in part on a disk cookie associated with the spare mass storage device; and read/write hardware logic to (i) forward client-initiated write requests directed to the particular mass storage device to the spare mass storage device for servicing, and (ii) initiate a device-to-device copy operation to systematically copy data from the particular mass storage device to the spare mass storage device without overwriting data on the spare mass storage device with stale data from the particular mass storage device.

13. The storage system of claim 12, further comprising:
data validation logic to analyze a data validity tag read from a storage area of the spare mass storage device, wherein the read/write hardware logic is to write data from a storage area of the particular mass storage device to a corresponding storage area of the spare mass storage device, in connection with a device-to-device copy operation, only if the data validation logic determines, based on the data validity tag, that the data at the corresponding storage area of the spare mass storage device is invalid.

14. The storage system of claim 12,
wherein the read/write hardware logic is to write a data validity tag to a particular storage area of the spare mass storage device when data from a storage area of the particular mass storage device is written to the particular storage area of the spare mass storage device.

15. The storage system of claim 12, further comprising:
data reconstruction logic to reconstruct data from a storage area of the particular mass storage device when the particular mass storage device cannot read the data at the storage area of the particular mass storage device in connection with a read request associated with a device-to-device copy operation.

16. The storage system of claim 12, further comprising:
data reconstruction logic to reconstruct data from a storage area of the particular mass storage device when the storage system has received a client-initiated read request directed to the storage area of the particular mass storage device, and the data from the storage area of the particular mass storage device has not been copied to a corresponding storage area of the spare mass storage device.

17. The storage system of claim 12, further comprising:
data reconstruction logic to reconstruct data from a storage area of the particular mass storage device when the storage system has received a client-initiated read request directed to the storage area of the particular mass storage device, and the data from a corresponding storage area of the spare mass storage device is determined to be invalid.

18. The storage system of claim 17, wherein, after the data reconstruction logic has reconstructed data from the storage area of the particular mass storage device in connection with a client-initiated read request directed to the storage area of the particular mass storage device, the read/write hardware logic is to write the reconstructed data to a corresponding storage area of the spare mass storage device.

19. The storage system of claim 12, further comprising:
a dirty bitmap to indicate which storage areas of the spare mass storage device have been written with valid data since the spare mass storage device was initially allocated to replace the particular mass storage device, wherein the read/write hardware logic is to (i) analyze the dirty bitmap, and (ii) copy data from a storage area of the particular mass storage device to a corresponding storage area of the spare mass storage device only if the dirty bitmap indicates that the corresponding storage area of the spare mass storage device is not storing valid data.

20. The storage system of claim 12, wherein, in response to receiving a client-initiated read request directed to a storage area of the particular mass storage device, the read/write hardware logic is to determine whether data at a corresponding storage area of the spare mass storage device is valid, and if so, the read/write hardware logic is to forward the client-initiated read request to the spare mass storage device for servicing.

21. A method for rapidly recovering data from a failing disk in a RAID disk group, the method comprising:
allocating a target disk, selected from one or more spare disks, to replace the failing disk in the RAID-disk group;
generating a disk cookie for the target disk, the disk cookie used to generate a data validity tag for indicating the validity of data written to the target disk;
preventing the failing disk from servicing client-initiated access requests by forwarding client-initiated write requests to the target disk for servicing, and forwarding client-initiated read requests to the target disk for servicing only if the client-initiated read request is directed to data at a disk block of the failing disk that has been copied to a corresponding disk block of the target disk as part of a disk-to-disk copy operation; and
systematically copying data from the failing disk to the target disk, as part of a disk-to-disk copy operation, without overwriting valid data on the target disk.

22. The method of claim 21, further comprising:
if a client-initiated read request is directed to data at a disk block of the failing disk that has not been copied to a corresponding disk block of the target disk as part of a disk-to-disk copy operation, reconstructing the data at the disk block of the failing disk.

23. The method of claim 22, further comprising:
generating a data validity tag associated with the reconstructed data; and
writing the data validity tag and the reconstructed data to the corresponding disk block of the target disk.

24. The method of claim 21, wherein systematically copying data
from the failing disk to the target disk without overwriting valid data on the target disk includes:
reading data from a disk block of the failing disk;
reading a data validity tag from a corresponding disk block of the target disk; and
writing the data from the disk block of the failing disk to the corresponding disk block of the target disk only if the data validity tag indicates the data from the corresponding disk block of the target disk is invalid.

25. The method of claim 21, further comprising:
if data from the disk block of the dead disk cannot be read, reconstructing data from the disk block of the dead disk.

26. A machine-readable medium storing instructions that, when executed by the machine, cause the machine to:
automatically allocate a spare mass storage device to replace a particular mass storage device in a redundancy group of mass storage devices, the particular mass storage device having been identified as incapable of servicing client-initiated access requests in a timely manner;
generate a disk cookie for the spare mass storage device, the disk cookie used to generate a data validity tag for indicating the validity of data written to the spare mass storage device;
forward client-initiated write requests directed to the particular mass storage device to the spare mass storage device for servicing; and initiate a device-to-device copy operation to systematically copy data from the particular mass storage device to the spare mass storage device without overwriting data on the spare mass storage device with stale data from the particular mass storage device.

* * * * *